United States Patent
Kussmann et al.

(10) Patent No.: US 11,543,311 B2
(45) Date of Patent: Jan. 3, 2023

(54) INTEGRATED TORQUE AND ANGLE SENSOR FOR STEERING COLUMN MONITORING WITH IMPROVED PERFORMANCE

(71) Applicant: Robert Bosch GmbH, Stuttgart (DE)

(72) Inventors: Adrian Kussmann, Reutlingen (DE); Andreas Kurz, Abstatt (DE); Christoph Ossmann, Reutlingen (DE); Guotao Chen, Jiangsu (CN); Michael Kleinknecht, Abstatt (DE); Mirko Scheer, Schwieberdingen (DE); Rolando Doelling, Reutlingen (DE); Sina Fella, Abstatt (DE)

(73) Assignee: Robert Bosch GmbH, Stuttgart (DE)

( * ) Notice: Subject to any disclaimer, the term of this patent is extended or adjusted under 35 U.S.C. 154(b) by 127 days.

(21) Appl. No.: 16/745,398

(22) Filed: Jan. 17, 2020

(65) Prior Publication Data
US 2020/0232858 A1 Jul. 23, 2020

(30) Foreign Application Priority Data
Jan. 17, 2019 (CN) .......................... 201910042472.6

(51) Int. Cl.
*G01L 3/10* (2006.01)
*G01B 7/30* (2006.01)

(52) U.S. Cl.
CPC ................ *G01L 3/102* (2013.01); *G01B 7/30* (2013.01)

(58) Field of Classification Search
None
See application file for complete search history.

(56) References Cited

U.S. PATENT DOCUMENTS

| | | | | |
|---|---|---|---|---|
| 6,479,987 B1* | 11/2002 | Marx | ..................... | G01D 5/145 324/207.2 |
| 9,316,482 B2* | 4/2016 | Delbaere | .............. | G01D 5/2458 |
| 9,651,437 B2* | 5/2017 | Ikeda | ...................... | G01L 3/101 |
| 2014/0184210 A1* | 7/2014 | Campbell | .............. | G01L 1/125 324/209 |

(Continued)

FOREIGN PATENT DOCUMENTS

JP 2014055823 3/2014

*Primary Examiner* — Lisa M Caputo
*Assistant Examiner* — Nigel H Plumb
(74) *Attorney, Agent, or Firm* — Michael Best & Friedrich LLP (57) ABSTRACT

A sensor for at least detecting steering torque of a steel steering column includes a magnetic field generating element which is configured to generate a magnetic field. The magnetic field penetrates the steering column so as to magnetize a steel material thereof. The sensor also includes a magnetic field detection element which is configured to detect a magnetic field change caused by a magnetoelastic effect of the magnetized steel material of the steering column when the steering column is subjected to torque stress. An output signal of the magnetic field detection element characterizes steering torque. The sensor also includes a base plate bearing the magnetic field generating element and the magnetic field detection element. The base plate is spaced from and separate from the steel steering column. The magnetic field generating element and the magnetic field detection element are directly mounted on the base plate.

24 Claims, 10 Drawing Sheets (56) References Cited

U.S. PATENT DOCUMENTS

| | | | |
|---|---|---|---|
| 2015/0035520 A1* | 2/2015 | Roesner | G01D 18/008 |
| | | | 324/207.25 |
| 2015/0137798 A1* | 5/2015 | Tanaka | A61G 5/041 |
| | | | 324/207.2 |
| 2015/0219163 A1* | 8/2015 | Drescher | F16C 41/00 |
| | | | 384/446 |
| 2016/0041007 A1* | 2/2016 | Lang | G01R 33/077 |
| | | | 324/207.2 |
| 2017/0219380 A1* | 8/2017 | Schaefer | G01D 5/145 |
| 2017/0254710 A1* | 9/2017 | Lee | B62D 15/02 |

\* cited by examiner

INTEGRATED TORQUE AND ANGLE SENSOR FOR STEERING COLUMN MONITORING WITH IMPROVED PERFORMANCE

BACKGROUND OF THE INVENTION

The present application relates to a torque sensor and integrated torque and angle sensor (TAS) for monitoring a vehicle steering state, and an active steering state monitoring system comprising the sensor.

Current and future vehicle steering systems, such as EHPS (an electronically controlled power steering system), EPS (an electric power steering system) and adaptive EPS, as well as certain driver assistance functions, such as ESP (electronic body stability program), ADAS (advanced driver assistance system) and HAD (advanced autonomous driving), all require the use of reliable steering torque and/or angle information. The various types of sensors used for steering detection must be suitable for multiple forms of application (different steering columns, independent sensor brackets, integration in combination switches, etc.), and it is also desired that the sensors have a very low price but also are reliable. No sensor solution in the prior art has yet been able to meet all of these requirements simultaneously.

SUMMARY OF THE INVENTION

In view of the situation in the prior art mentioned above, an object of the present application is to provide a sensor for monitoring a steering state, which is able to accomplish the detection of at least steering torque with a simple structure and at a low cost.

For this purpose, the present application provides, in one aspect thereof, a torque sensor for detecting steering torque of a steel steering column, comprising: a magnetic field generating element, configured to generate a magnetic field, the magnetic field penetrating the steering column so as to magnetize a steel material thereof; a magnetic field detection element, configured to detect a magnetic field change caused by a magnetoelastic effect of the magnetized steel material of the steering column when the steering column is subjected to torque stress, wherein an output signal of the magnetic field detection element characterizes steering torque; and a base plate, bearing the magnetic field generating element and the magnetic field detection element.

In the torque sensor of the present application, optionally, the magnetic field generating element and the magnetic field detection element are arranged to face the steering column, and preferably arranged to be substantially perpendicular to a central axis of the steering column.

In the torque sensor of the present application, optionally, the magnetic field generating element comprises a magnetic field generating coil, and the magnetic field detection element comprises at least one pair of magnetic field detection coils arranged on two opposite sides of the magnetic field generating coil.

In the torque sensor of the present application, optionally, the magnetic field detection element comprises two or more pairs of magnetic field detection coils arranged around the magnetic field generating coil.

In the torque sensor of the present application, optionally, the two magnetic field detection coils in each pair are oriented in opposite directions to each other.

In another aspect thereof, the present application provides an integrated torque and angle sensor for detecting steering torque and steering angle of a steel steering column, comprising: a magnetic field generating element, configured to generate a first magnetic field, the first magnetic field penetrating the steering column so as to magnetize a steel material thereof; a first magnetic field detection element, configured to detect a first magnetic field change caused by a magnetoelastic effect of the magnetized steel material of the steering column when the steering column is subjected to torque stress, wherein an output signal of the first magnetic field detection element characterizes steering torque; a magnetic driven member, associated with the steering column and configured to follow rotation of the steering column; a second magnetic field detection element, configured to detect a change in a second magnetic field penetrating the magnetic driven member, wherein an output signal of the second magnetic field detection element characterizes steering angle; and a base plate, bearing the magnetic field generating element and the first and second magnetic field detection elements.

In the integrated torque and angle sensor of the present application, optionally, the magnetic field generating element and the first and second magnetic field detection elements are arranged to face the steering column, and preferably arranged to be substantially perpendicular to a central axis of the steering column.

In the integrated torque and angle sensor of the present application, optionally, the second magnetic field is also generated by the magnetic field generating element; or the second magnetic field is generated by an additional magnetic field generating element.

In the integrated torque and angle sensor of the present application, optionally, the magnetic field generating element comprises a magnetic field generating coil, and the first magnetic field detection element comprises at least one pair of magnetic field detection coils arranged on two opposite sides of the magnetic field generating coil.

In the integrated torque and angle sensor of the present application, optionally, the two magnetic field detection coils in each pair are oriented in opposite directions to each other.

In the integrated torque and angle sensor of the present application, optionally, the first magnetic field detection element comprises two or more pairs of magnetic field detection coils arranged around the magnetic field generating coil.

In the integrated torque and angle sensor of the present application, optionally, the second magnetic field detection element comprises at least one pair of magnetic field detection coils.

In the integrated torque and angle sensor of the present application, optionally, in the second magnetic field detection element, the two magnetic field detection coils in each pair are oriented in opposite directions to each other.

In the integrated torque and angle sensor of the present application, optionally, the magnetic driven member comprises a detection ring, surrounding the steering column and being fixed to the steering column in order to rotate together with the steering column, the detection ring having different axial heights and/or widths and/or slopes and/or shapes at different angular positions; the detection ring is made of a magnetizable material such as steel, or the detection ring bears magnets distributed in different circumferential regions of the detection ring.

In the integrated torque and angle sensor of the present application, optionally, the magnetic driven member comprises a drive gear installed around the steering column so as to rotate together with the steering column, and at least two magnetic driven gears having different numbers of teeth and all being meshed with the drive gear.

In the integrated torque and angle sensor of the present application, optionally, the magnetic driven member comprises a drive gear installed around the steering column so as to rotate together with the steering column, and a magnetic rack meshed with the drive gear.

In the integrated torque and angle sensor of the present application, optionally, a temperature sensor for detecting steering column temperature is also integrated.

In the torque sensor or integrated torque and angle sensor of the present application, optionally, the base plate comprises two or more base plates, arranged around the steering column and connected to each other by a flexible electrical cable.

In another aspect thereof, the present application provides a steering column active steering state monitoring system, comprising the torque sensor as described above, and a data processing unit constructed to determine a steering torque of the steering column on the basis of an output signal of the torque sensor. Optionally, the magnetic field detection element of the torque sensor comprises two or more pairs of magnetic field detection coils; and the data processing unit is further configured to subject the determined steering torque to comprehensive processing and credibility evaluation, to obtain comprehensive steering torque data.

In another aspect thereof, the present application provides a steering column active steering state monitoring system, comprising the integrated torque and angle sensor as described above, and a data processing unit constructed to determine a steering torque and steering angle of the steering column on the basis of an output signal of the integrated torque and angle sensor. Optionally, the first magnetic field detection element of the torque and angle sensor comprises two or more pairs of magnetic field detection coils, and the second magnetic field detection element comprises two or more magnetic field detection coils; and the data processing unit is further configured to subject the determined steering torque and steering angle to comprehensive processing and credibility evaluation, to obtain comprehensive steering torque and steering angle data.

According to the present application, the torque sensor or integrated torque and angle sensor comprises an electromagnetic coil, for detecting the steering torque of the steering column on the basis of stress in the steering column caused by steering torque. Various sensing elements in the sensor may be integrated on a single PCB, with no need to use an ASIC, hence the sensor has a low cost. In addition, the sensor detects the torque (or both the torque and the steering angle) on the basis of a change in the magnetic field, and the detection lag is small.

The sensor of the present application may be used for various vehicle functions, such as ESP, ADAS and HAD, and also used for fault safety and fault operating solutions.

BRIEF DESCRIPTION OF THE DRAWINGS

Through the following detailed description which makes reference to the accompanying drawings, the abovementioned and other aspects of the present application can be understood more fully; in the drawings.

DETAILED DESCRIPTION

The present application relates, in one aspect thereof, to a torque sensor, constructed to be used for detecting a steering torque of a vehicle steering column.

Figure 1:
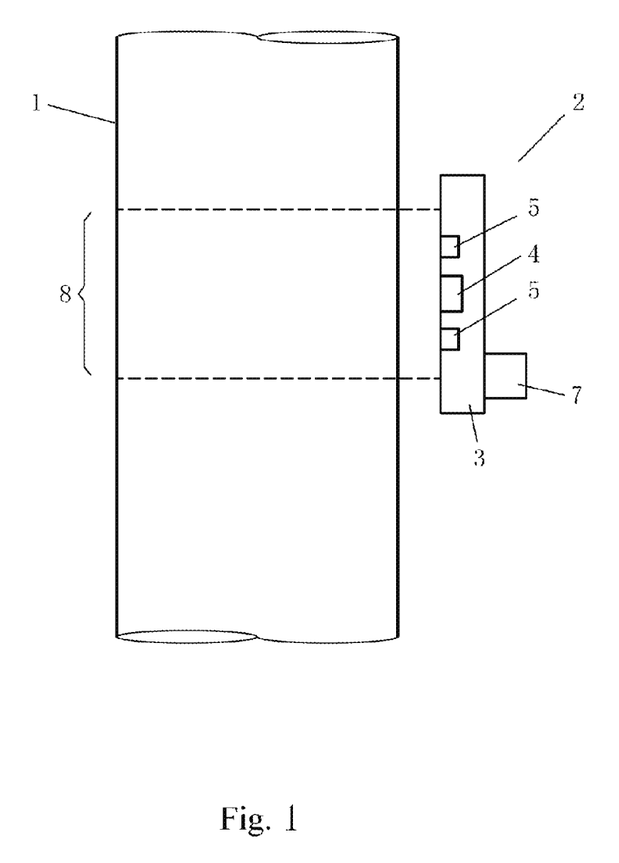
FIG. 1 is a schematic sectional view of a torque sensor according to an embodiment of the present application.

The torque sensor may be formed to have various structures; one embodiment thereof is shown in FIG. 1. FIG. 1 shows a steering column 1 of a vehicle, and a torque sensor 2 mounted at a side of the steering column 1, the torque sensor being used for detecting a steering torque.

The torque sensor 2 mainly comprises a base plate 3, mounted in a housing (not shown). The housing may be fixed in the vehicle, for example by means of an independent sensor bracket. The torque sensor 2 further comprises an active magnetic field generating coil 4, and at least one pair of magnetic field detection coils (detection fluxgates) 5 arranged at two radially opposite sides (preferably symmetrically) of the magnetic field generating coil 4. The magnetic field generating coil 4 and the magnetic field detection coils 5 are borne by the base plate 3.

The magnetic field generating coil 4 and the magnetic field detection coils 5 face the steering column 1, preferably being substantially perpendicular to a central axis of the steering column 1, and a torque detection region 8 is defined in front of them.

The torque sensor 2 further comprises a connector 7, mounted on the base plate 3 and used for coupling with a matching connector in order to establish an electrical connection with another element.

Figure 2:
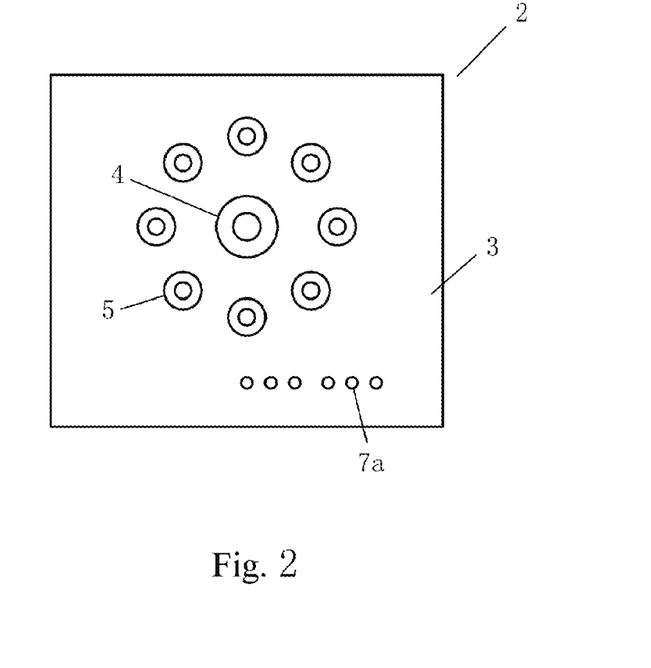
FIG. 2 is a schematic top view of the torque sensor shown in FIG. 1.

In the layout shown in FIG. 2, four pairs of magnetic field detection coils 5 are arranged around the magnetic field generating coil 4. It will be understood that different quantities of paired magnetic field detection coils 5 may be used.

In addition, as shown in FIG. 2, a set of connector pins 7a of the connector 7 are arranged along an edge of the base plate 3.

Figure 3:
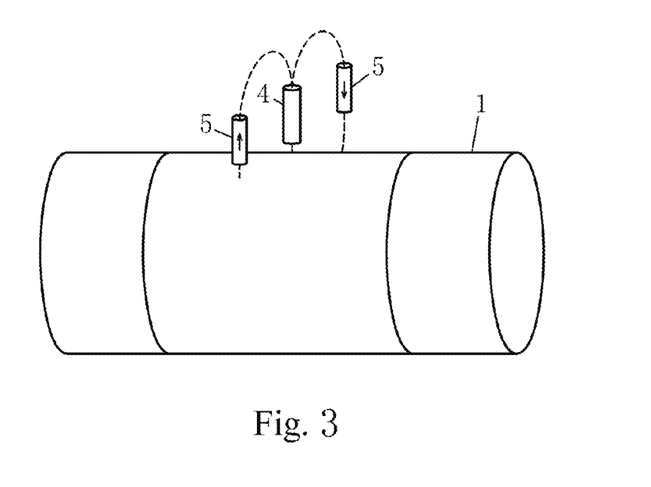
FIG. 3 shows schematically the orientations of coils in the torque sensor shown in FIG. 1.

In each pair of radially opposite magnetic field detection coils 5, the two magnetic field detection coils 5 are oriented in opposite directions to each other, as shown schematically in FIG. 3. Thus, signals from one pair of magnetic field detection coils 5 are substantially opposite to each other and preferably substantially equal to each other, so that the signals of the two magnetic field detection coils can be comprehensively processed in order to increase signal reliability.

The steering column 1 is made of steel. When the magnetic field generating coil 4 is energized to generate a magnetic field, the magnetic field penetrates the steering column 1, and a magnetic flux at the magnetic field detection coils 5 can be detected by the magnetic field detection coils 5. The steel material of the steering column 1 is magnetized by the magnetic field. In such circumstances, if the steering column 1 is subjected to a torque, then due to a magnetoelastic effect of the magnetized steel material, the transmittance of the magnetic field penetrating the magnetized steel material changes, and the magnetic flux detected by the magnetic field detection coils 5 also changes. Based on output signals of the magnetic field detection coils 5, the torque acting on the steering column 1 can be determined. Torque data generated by different magnetic field detection coils 5 can be compared and subjected to credibility (rationality) evaluation, for example by means of a data processing unit, to obtain a precise comprehensive steering torque. The data processing unit may comprise a signal calculation module, constructed to calculate a steering torque on the basis of signals from the magnetic field detection coils 5, and a credibility evaluation module, for subjecting calculation data from the signal calculation module to comprehensive processing and credibility evaluation, to obtain comprehensive steering torque data.

The present application further relates to an active steering state monitoring system, comprising a torque sensor 2; based on a steering torque signal detected by the sensor 2, the active steering state monitoring system monitors a state of the steering column 1, in particular during operation of the steering column 1. The active steering state monitoring system may further comprise the data processing unit described above.

In another aspect, the present application relates to an integrated torque and angle sensor (TAS), constructed to be used for simultaneously detecting a steering torque and a steering angle of a vehicle steering column. For this purpose, the torque and angle sensor comprises a torque detection part for detecting a steering torque, and an angle detection part for detecting a steering angle. These two parts are integrated as a single sensor, and both operate by detecting a change in a magnetic field.

Figure 4:
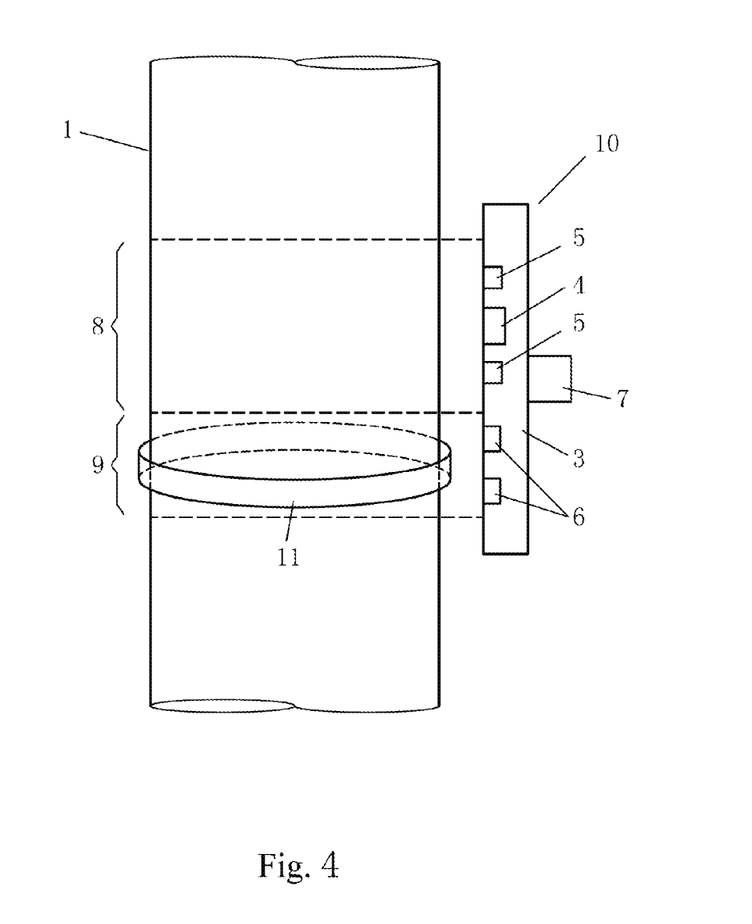
FIG. 4 is a schematic sectional view of a torque and angle sensor according to an embodiment of the present application.

The torque and angle sensor may be formed to have various structures; one embodiment thereof is shown in FIG. 4. FIG. 4 shows a steering column 1 of a vehicle, and a torque and angle sensor 10 mounted at a side of the steering column 1, the torque and angle sensor being used for detecting a steering torque and a steering angle.

The torque and angle sensor 10 mainly comprises a base plate 3, mounted in a housing (not shown). The housing may be fixed in the vehicle, for example by means of an independent sensor bracket. The torque and angle sensor 10 further comprises an active magnetic field generating coil 4, and at least one pair of magnetic field detection coils (detection fluxgates) 5 arranged at two radially opposite sides (preferably symmetrically) of the magnetic field generating coil 4. The magnetic field generating coil 4 and the magnetic field detection coils 5 are borne by the base plate 3. The torque and angle sensor 10 further comprises at least one magnetic field detection coil 6, which is also borne by the base plate 3. The torque and angle sensor 10 further comprises a connector 7, mounted on the base plate 3 and used for coupling with a matching connector in order to establish an electrical connection with another element.

The magnetic field generating coil 4 and the magnetic field detection coils 5 face a first section of the steering column 1, preferably being substantially perpendicular to a central axis of the steering column 1, and a torque detection region 8 is defined in front of them; the magnetic field detection coil 6 faces a second section of the steering column 1, and an angle detection region 9 is defined in front of it.

The steering column 1 is made of steel. When the magnetic field generating coil 4 is energized to generate a magnetic field, the magnetic field penetrates the steering column 1, and a magnetic flux at the magnetic field detection coils 5 can be detected by the magnetic field detection coils 5. The steel material of the steering column 1 is magnetized by the magnetic field. In such circumstances, if the steering column 1 is subjected to a torque, then due to a magnetoelastic effect of the magnetized steel material, the transmittance of the magnetic field penetrating the magnetized steel material changes, and the magnetic flux detected by the magnetic field detection coils 5 also changes. Based on output signals of the magnetic field detection coils 5, the torque acting on the steering column 1 can be determined.

A detection ring 11 surrounds the second section of the steering column 1 and is fixed to the steering column 1, in order to rotate together with the steering column 1. The detection ring 11 is made of a magnetizable material such as steel. Alternatively, the detection ring 11 bears magnets distributed in different circumferential regions of the detection ring 11. The detection ring 11 has different axial heights and/or widths and/or slopes and/or shapes at different angular positions, so that a magnetic field penetrating the detection ring 11 and the second section of the steering column 1 changes as the detection ring 11 rotates together with the steering column 1, because different regions of the detection ring 11 face the magnetic field detection coil 6. The change in the magnetic field can be detected by the magnetic field detection coil 6. Based on an output signal of the magnetic field detection coil 6, the steering angle of the steering column 1 can be determined.

The magnetic field penetrating the second section of the steering column 1 may be the same magnetic field which penetrates the first section of the steering column 1; in other words, the magnetic field generating coil 4 is used for generating a magnetic field which simultaneously covers the torque detection region 8 and the angle detection region 9. However, in order to achieve higher detection precision, a separate magnetic field generating coil may be used to generate a magnetic field penetrating the second section of the steering column 1 (mainly covering the angle detection region 9), while the magnetic field generating coil 4 only generates a magnetic field penetrating the first section of the steering column 1 (mainly covering the torque detection region 8).

Optionally, the magnetic field detection coil 6 comprises at least one pair of magnetic field detection coils 6, with the two magnetic field detection coils 6 in each pair preferably being oriented in opposite directions to each other.

The magnetic field generating coil 4 and the magnetic field detection coils 5 may be arranged in a first area of the base plate 3; the magnetic field detection coils 6 (and the magnetic field generating coil corresponding thereto, if present) may be arranged in a second area of the base plate 3. In the layout shown in FIG. 5, four pairs of magnetic field detection coils 5 are arranged around the magnetic field generating coil 4, and four magnetic field detection coils 6 are arranged in an array. It will be understood that different quantities of paired magnetic field detection coils 5 and different quantities of magnetic field detection coils 6 may be used.

Figure 5:
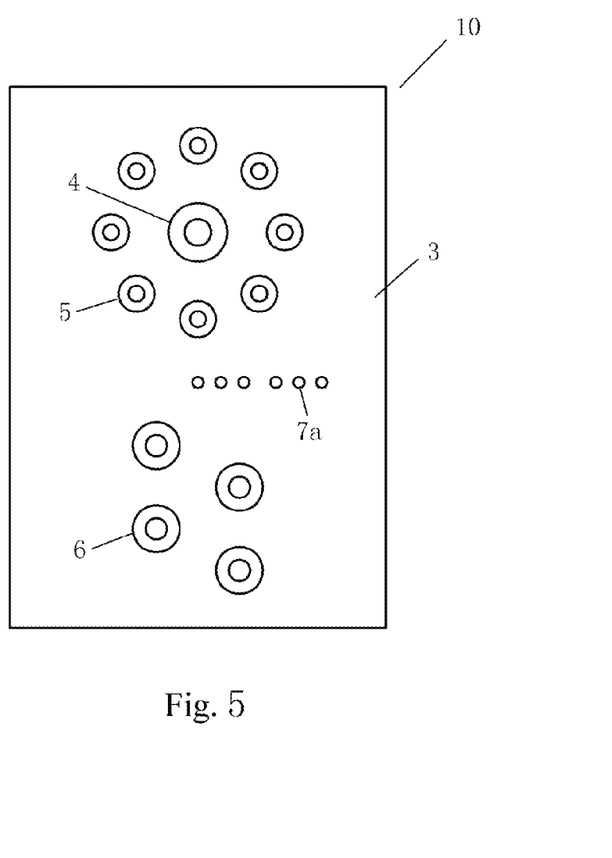
FIG. 5 is a schematic top view of the torque and angle sensor shown in FIG. 4.

In addition, as shown in FIG. 5, a set of connector pins 7a of the connector 7 are arranged between the magnetic field detection coils 5 on the one hand and the magnetic field detection coils 6 on the other.

In each pair of radially opposite magnetic field detection coils 5, the two magnetic field detection coils 5 are oriented in opposite directions to each other. Thus, signals from one pair of magnetic field detection coils 5 are substantially opposite to each other and preferably substantially equal to each other, so that the signals of the two magnetic field detection coils can be comprehensively processed in order to increase signal reliability.

Figure 6:
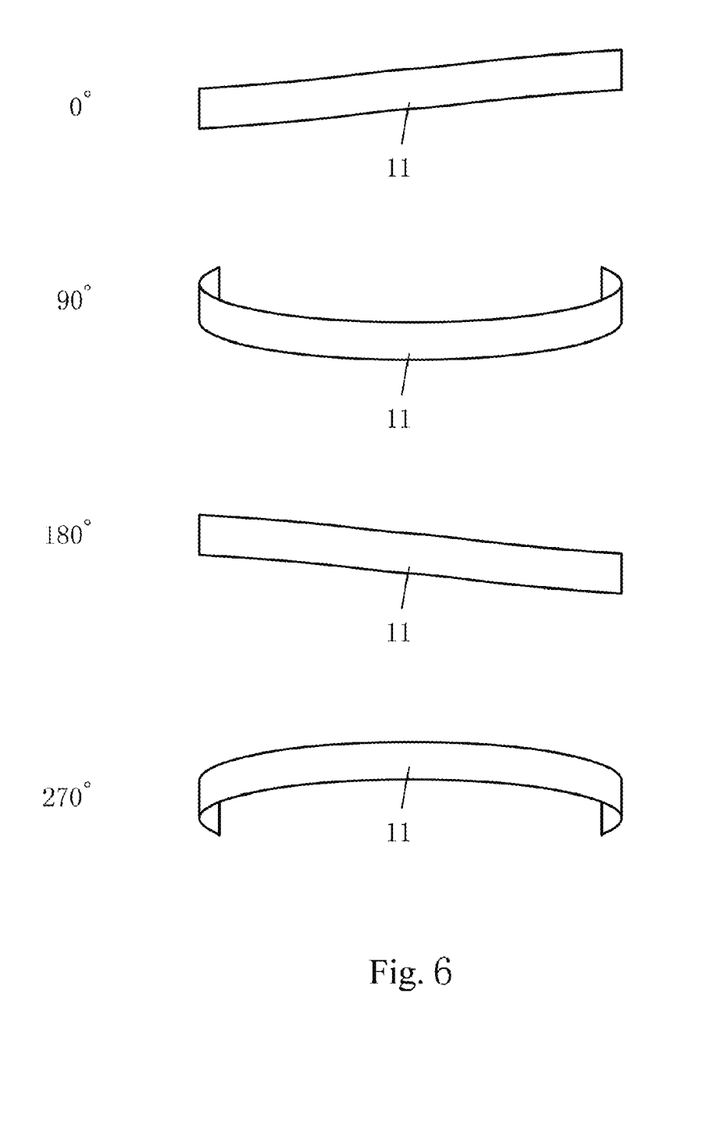
FIG. 6 schematically shows states of a detection ring in an angle detection part of a torque and angle sensor during operation of the torque and angle sensor.

The detection ring 11 may be formed as a closed ring. In the embodiment shown in FIG. 6, the detection ring 11 has a substantially constant axial width, but extends along a curved or sloping path in a circumferential direction. As the detection ring 11 rotates together with the steering column 1, different regions of the detection ring 11 face the magnetic field detection coil 6, wherein at least the axial positions of the different regions are different from one another. At a steering angle of 0°, a sloping region (being higher at a right side thereof than at a left side thereof) of the detection ring 11 faces the magnetic field detection coil 6; at a steering angle of 90°, a curved region (being higher at a right side and left side thereof than in a middle part thereof) faces the magnetic field detection coil 6; at a steering angle of 180°, a sloping region (being higher at a left side thereof than at a right side thereof) faces the magnetic field detection coil 6; at a steering angle of 270°, a curved region (being higher in a middle part thereof than at a right side and left side thereof) faces the magnetic field detection coil 6. The magnetic field detection coil 6 detects a change in the magnetic field which penetrates the second section of the steering column 1 but is partially blocked by the detection ring 11. The output signal of the magnetic field detection coil 6 can be used to determine the steering angle of the steering column 1. When more than one magnetic field detection coil 6 is used, signals therefrom can be comprehensively processed in order to increase signal reliability.

Figure 7:
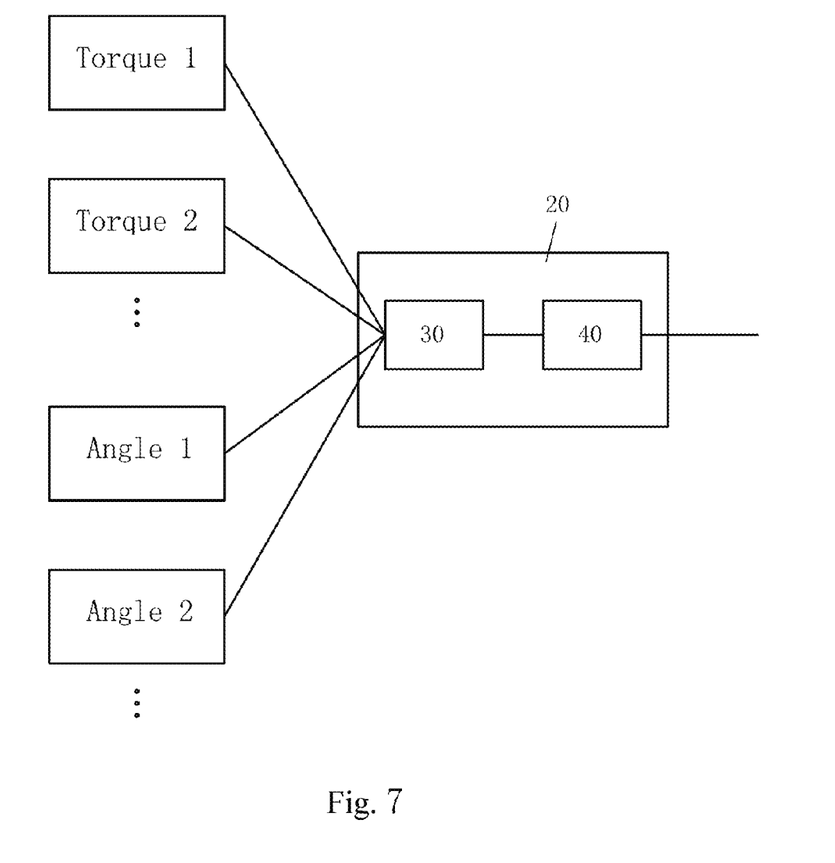
FIG. 7 is a schematic block diagram showing signal calculation and comprehensive processing of a torque detection part and a steering angle detection part of a torque and angle sensor.

As shown in FIG. 7, signals from the magnetic field detection coils 5 and magnetic field detection coils 6 of the torque and angle sensor 10 may be inputted into a data processing unit 20, the data processing unit 20 comprising a signal calculation module 30 and a credibility evaluation module 40. In the signal calculation module 30, signals Torque 1, Torque 2 . . . from the magnetic field detection coils 5 are used to determine steering torque data, and signals Angle 1, Angle 2 . . . from the magnetic field detection coils 6 are used to determine steering angle data. The determined data is inputted into the credibility evaluation module 40; here, torque data generated on the basis of different magnetic field detection coils 5 is compared and subjected to credibility evaluation to obtain a precise comprehensive steering torque, and angle data generated on the basis of different magnetic field detection coils 6 is compared and subjected to credibility evaluation to obtain a precise comprehensive steering angle. Furthermore, the torque data generated on the basis of the magnetic field detection coils 5 and the angle data generated on the basis of the magnetic field detection coils 6 may also be comprehensively processed and subjected to credibility evaluation in the credibility evaluation module 40 to obtain a steering torque and steering angle of higher precision. For example, based on the detected angle data, an angular acceleration of the steering column 1 can be calculated, and a theoretical steering torque can be calculated on the basis of the angular acceleration of the steering column 1 and the total moment of inertia of the steering column 1 and components driven by the steering column 1. By comparing the calculated theoretical steering torque with the detected steering torque, steering torque credibility evaluation can be realized.

Comprehensive steering torque and steering angle data is outputted by the data processing unit 20, in order to be provided to functional units which will use the data, such as ESP, EPS . . . .

A temperature sensor (not shown) for detecting a temperature of the steering column 1 may also be integrated in the torque and angle sensor 10. The temperature sensor is similarly borne by the base plate 3. The temperature sensor for example may comprise a thermocouple.

The present application further relates to an active steering state monitoring system, comprising a torque and angle sensor 10; based on detected steering torque and steering angle signals, the active steering state monitoring system monitors a state of the steering column 1, in particular during operation of the steering column 1. The active steering state monitoring system may further comprise the data processing unit 20 described above.

Figure 8:
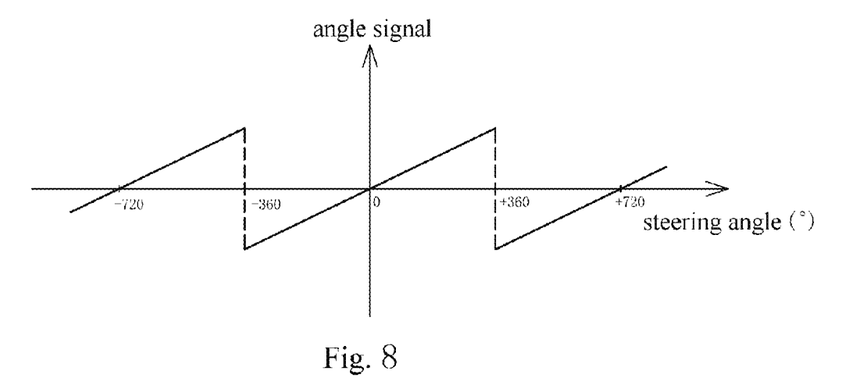
FIGS. 8 and 9 are schematic graphs of an angle signal and a torque signal detected by a torque and angle sensor.
Figure 9:
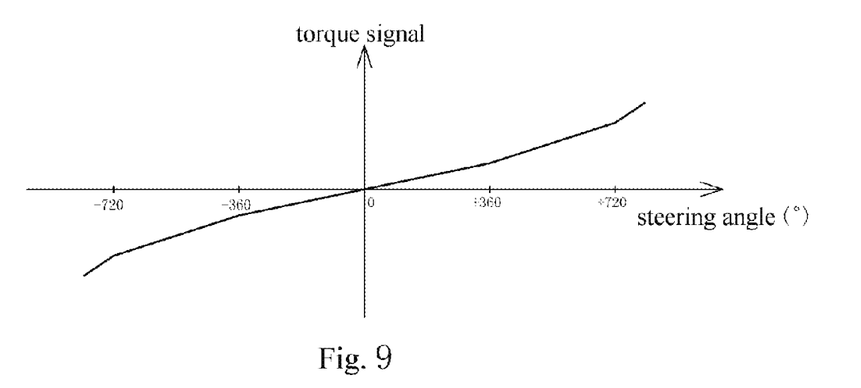

FIGS. 8 and 9 show schematically original signals from the torque and angle sensor 10. It can be seen from FIG. 8 that a detected angle signal varies periodically. It can be seen from FIG. 9 that within a steering angle range of −360° to +360° of the steering column 1, a detected torque signal varies at a lower rate, but beyond −360° and +360°, the detected torque signal varies at a higher rate. Based on the detected angle signal and torque signal, for applications in the range of ±360°, the signal calculation module 30 can calculate the steering angle and torque directly.

Figure 10:
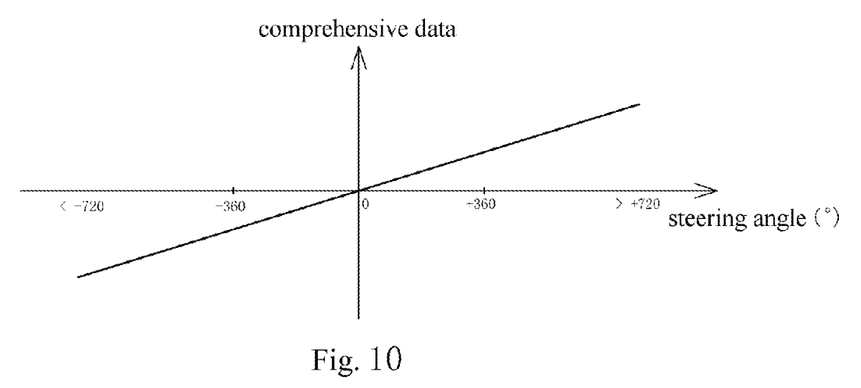
FIG. 10 is a schematic graph of the merged angle signal and torque signal.

For applications in the range of ±720° or a larger range of angles, the detected angle signal is merged with the detected torque signal to determine the steering angle, for example by means of the Ackermann steering model. FIG. 10 schematically shows merged steering angle data (after merging with the torque signal). The merged data may be compared with an angular position stored in a memory (e.g. EEPROM), in order to perform correction.

In order to further improve reliability and precision, two or more data processing units 20 may be arranged in a parallel-connected manner. Comprehensive steering torque data and steering angle data outputted from one data processing unit 20 may be used alone; or comprehensive steering torque and steering angle data outputted from two data processing units 20 may be used for comparison and correction.

The torque sensor 2 or torque and angle sensor 10 may be constructed in another form, in order to be adapted to different applications or have improved performance.

Figure 11:
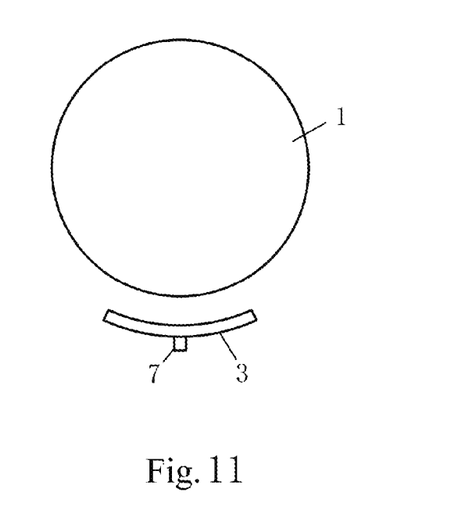
FIG. 11 is a schematic top view of a sensor according to a modification of the present application.

For example, the base plate 3 of the torque sensor 2 or torque and angle sensor 10 may be flat; alternatively, in a modified example, the base plate 3 may be a curved section in order to substantially follow an outer contour of the steering column 1, as shown schematically in FIG. 11.

Figure 12:
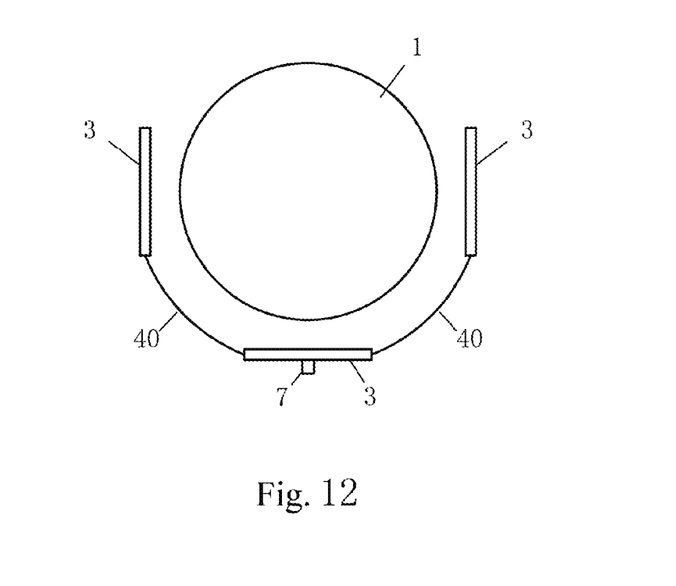
FIG. 12 is a schematic top view of a sensor according to another modification of the present application.

In another modification shown in FIG. 12, the torque sensor 2 or torque and angle sensor 10 comprises one or more base plates 3 (respectively having corresponding magnetic field generating and detection elements) distributed around the steering column 1. The base plates 3 are connected to each other by flexible electrical cables 40, and a common connector 7 is used for coupling with a matching connector.

Figure 13:
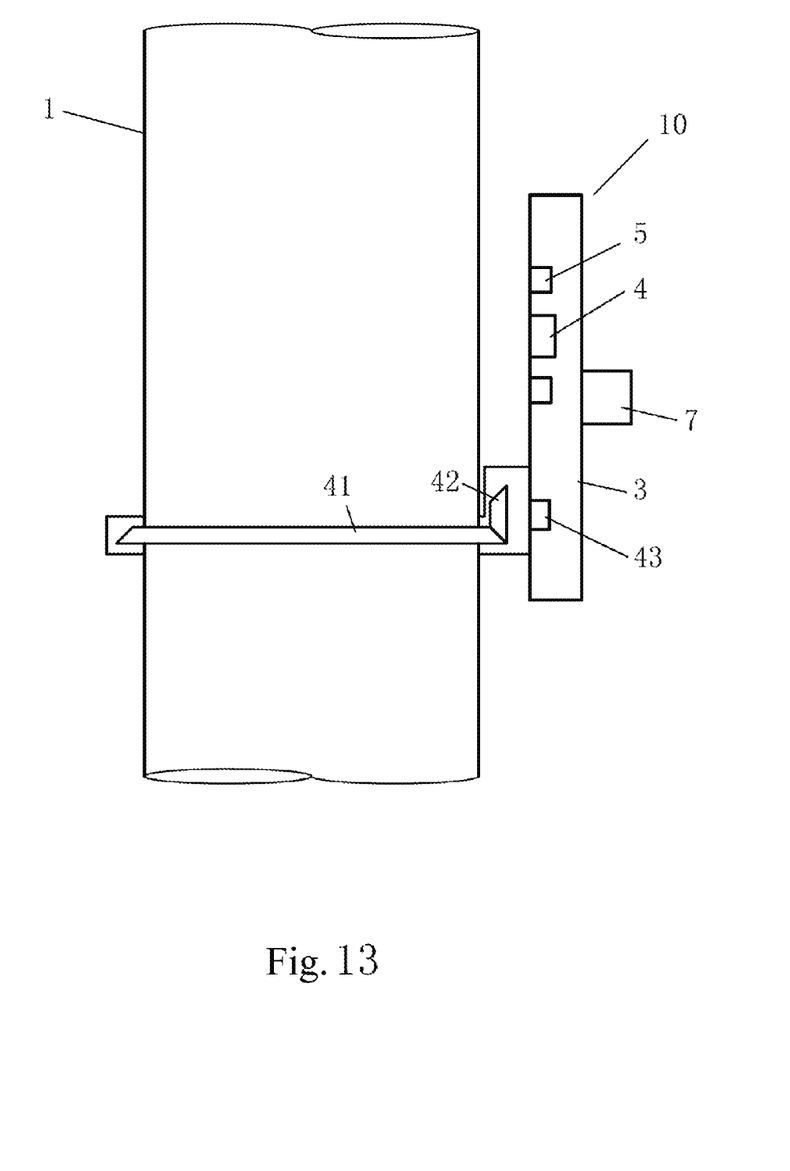
FIG. 13 is a schematic sectional view of a torque and angle sensor according to another embodiment of the present application.

According to another embodiment of the torque and angle sensor 10 of the present application, as shown in FIG. 13, in order to detect steering angle, a set of gears is used to replace the detection ring 11 described above. These gears comprise a drive gear (bevel gear) 41, installed around the steering column 1 so as to rotate together with the steering column 1, and two magnetic driven gears (bevel gears) 42 (only one of which is shown in FIG. 13) meshed with the gear 41. The two magnetic driven gears 42 have different numbers of teeth, and corresponding magnetic field generating and detection elements 43 are allocated for each driven gear 42 respectively. The steering angle can be calculated on the basis of the Nonius principle, by means of the two sets of magnetic field generating and detection elements 43. Other aspects of the embodiment shown in FIG. 13 are identical or similar to those shown in FIG. 4 and described above, so are not described again. It will be understood that in the case where the magnetic field generated by the magnetic field generating coil 4 is sufficient to cover the driven gear 42 (angle detection region), only a corresponding magnetic field detection element need be allocated for each driven gear 42 respectively (with no need to allocate a separate magnetic field generating element). It can also be understood that the gear 41 and gears 42 shown in FIG. 13 are all bevel gears, but could also be cylindrical gears.

Figure 14:
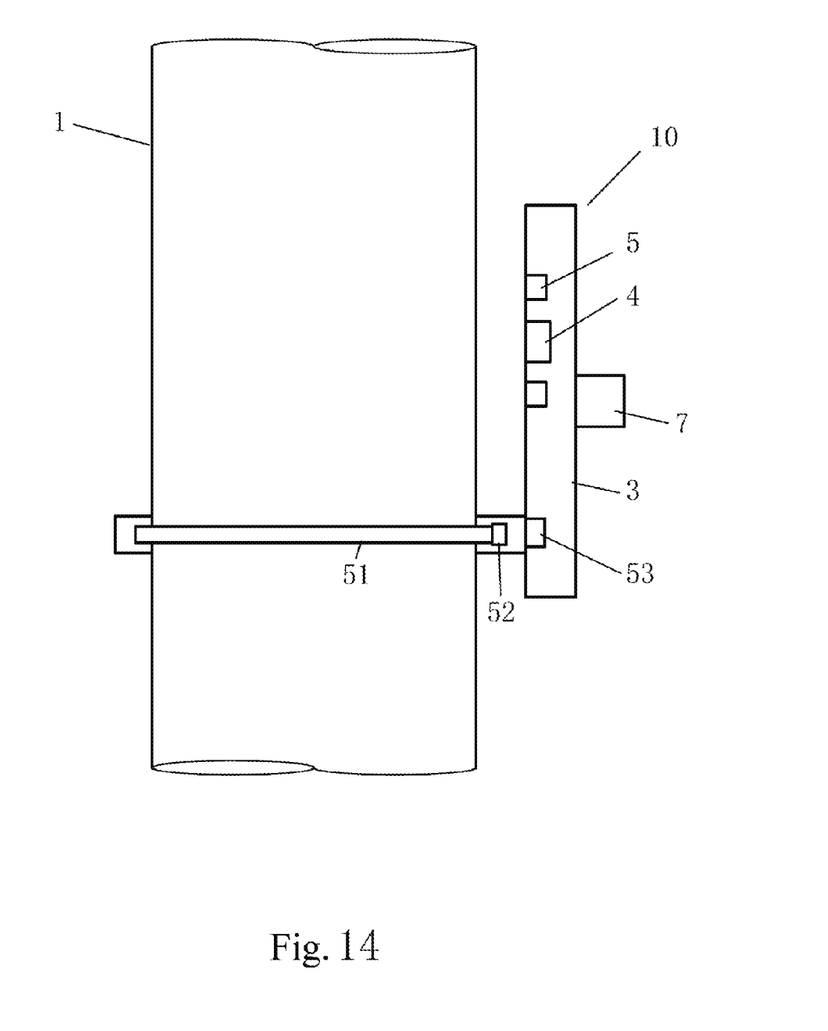
FIG. 14 is a schematic sectional view of a torque and angle sensor according to another embodiment of the present application.

According to another embodiment of the torque and angle sensor 10 of the present application, as shown in FIG. 14, in order to detect steering angle, a drive gear 51 and a rack 52 are used to replace the detection ring 11 described above. The gear 51 is installed around the steering column 1 so as to rotate together with the steering column 1, and the gear 51 is meshed with the rack 52. The rack 52 is magnetized and equipped with corresponding magnetic field generating and detection elements 53. The steering angle can be calculated by detecting a change in the magnetic field covering the rack 52. Other aspects of the embodiment shown in FIG. 14 are identical or similar to those shown in FIG. 4 and described above, so are not described again. It will be understood that in the case where the magnetic field generated by the magnetic field generating coil 4 is sufficient to cover the rack 52 (angle detection region), only a magnetic field detection element need be allocated for the rack 52 (with no need to allocate a separate magnetic field generating element).

Based on the principle of the present application, those skilled in the art may design other structures of the torque sensor or torque and angle sensor.

According to the present application, the torque sensor or integrated torque and angle sensor comprises an electromagnetic coil, for detecting the steering torque of the steering column on the basis of the magnetoelastic effect when the steering column is subjected to steering torque. Various sensing elements of the torque and angle sensor may be integrated in a single PCB, with no need to use an ASIC, hence the sensor has a low cost. In addition, the torque sensor or torque and angle sensor detects the steering torque or detects both the torque and the steering angle on the basis of a change in the magnetic field, hence the detection lag is small.

With regard to the embodiment of the torque sensor shown in FIG. 1 and the embodiment of the torque and angle sensor shown in FIG. 4, they may be called non-contact sensors, as they contain no elements which come into contact with the steering column, thus the operation of the sensors will not affect the operation or rigidity (and feel) of the steering column.

Moreover, with regard to the embodiment in which a common magnetic field generating coil is used in the torque and angle sensor to generate a magnetic field which simultaneously covers the torque detection region and the angle detection region, the quantity of components can be reduced, thereby further reducing the cost of the sensor.

Although the present application has been described herewith reference to particular embodiments, the scope of the present application is not limited to the details shown. Various amendments may be made to these details without departing from the basic principles of the present application.

The invention claimed is:

1. A torque sensor for detecting steering torque of a steel steering column, the torque sensor comprising:
   a magnetic field generating element, configured to generate a magnetic field, the magnetic field penetrating the steering column so as to magnetize a steel material thereof;
   a magnetic field detection element, configured to detect a magnetic field change caused by a magnetoelastic effect of the magnetized steel material of the steering column when the steering column is subjected to torque stress, wherein an output signal of the magnetic field detection element characterizes steering torque; and
   a base plate, bearing the magnetic field generating element and the magnetic field detection element, wherein the base plate is spaced from and separate from the steel steering column, and wherein the magnetic field generating element and the magnetic field detection element are directly mounted on the base plate.

2. The torque sensor as claimed in claim 1, wherein the magnetic field generating element and the magnetic field detection element are arranged to face the steering column.

3. The torque sensor as claimed in claim 1, wherein the magnetic field generating element and the magnetic field detection element are arranged to face the steering column, and arranged to be substantially perpendicular to a central axis of the steering column.

4. The torque sensor as claimed in claim 1, wherein the magnetic field generating element comprises a magnetic field generating coil, and the magnetic field detection element comprises at least one pair of magnetic field detection coils arranged on two opposite sides of the magnetic field generating coil.

5. The torque sensor as claimed in claim 1, wherein the magnetic field detection element comprises two or more pairs of magnetic field detection coils arranged around the magnetic field generating coil; and wherein the two magnetic field detection coils in each pair are oriented in opposite directions to each other.

6. The torque sensor as claimed in claim 1, wherein the base plate comprises two or more base plates, arranged around the steering column and connected to each other by a flexible electrical cable.

7. A steering column active steering state monitoring system, comprising the torque sensor as claimed in claim 1, and a data processing unit configured to determine a steering torque of the steering column on the basis of an output signal of the torque sensor.

8. The steering column active steering state monitoring system as claimed in claim 7, wherein the magnetic field detection element of the torque sensor comprises two or more pairs of magnetic field detection coils; and
   the data processing unit is further configured to subject the determined steering torque to comprehensive processing and credibility evaluation, to obtain comprehensive steering torque data.

9. An integrated torque and angle sensor for detecting steering torque and steering angle of a steel steering column, the sensor comprising:
- a magnetic field generating element, configured to generate a first magnetic field, the first magnetic field penetrating the steering column so as to magnetize a steel material thereof;
- a first magnetic field detection element, configured to detect a first magnetic field change caused by a magnetoelastic effect of the magnetized steel material of the steering column when the steering column is subjected to torque stress, wherein an output signal of the first magnetic field detection element characterizes steering torque;
- a magnetic driven member, surrounding the steering column and being fixed to the steering column in order to rotate together with the steering column, the magnetic driven member including magnetizable material or bearing a magnet;
- a second magnetic field detection element, configured to detect a change in a second magnetic field penetrating the magnetic driven member, wherein an output signal of the second magnetic field detection element characterizes steering angle; and
- a base plate, bearing the magnetic field generating element and the first and second magnetic field detection elements.

10. The integrated torque and angle sensor as claimed in claim 9, wherein the magnetic field generating element and the first and second magnetic field detection elements are arranged to face the steering column.

11. The integrated torque and angle sensor as claimed in claim 9, wherein the magnetic field generating element and the first and second magnetic field detection elements are arranged to face the steering column, and arranged to be substantially perpendicular to a central axis of the steering column; and wherein the second magnetic field is also generated by the magnetic field generating element; or the second magnetic field is generated by an additional magnetic field generating element.

12. The integrated torque and angle sensor as claimed in claim 9, wherein the magnetic field generating element comprises a magnetic field generating coil, and the first magnetic field detection element comprises at least one pair of magnetic field detection coils arranged on two opposite sides of the magnetic field generating coil.

13. The integrated torque and angle sensor as claimed in claim 9, wherein the magnetic field generating element comprises a magnetic field generating coil, and the first magnetic field detection element comprises at least one pair of magnetic field detection coils arranged on two opposite sides of the magnetic field generating coil; wherein, in the first magnetic field detection element, the two magnetic field detection coils are oriented in opposite directions to each other; wherein the first magnetic field detection element comprises two or more pairs of magnetic field detection coils arranged around the magnetic field generating coil; wherein the second magnetic field detection element comprises at least one pair of magnetic field detection coils; and wherein, in the second magnetic field detection element, the two magnetic field detection coils are oriented in opposite directions to each other.

14. The integrated torque and angle sensor as claimed in claim 9, wherein the magnetic driven member comprises a detection ring, surrounding the steering column and being fixed to the steering column in order to rotate together with the steering column, the detection ring having different axial heights and/or widths and/or slopes and/or shapes at different angular positions; the detection ring is made of a magnetizable material.

15. The integrated torque and angle sensor as claimed in claim 9, wherein the magnetic driven member comprises a detection ring, surrounding the steering column and being fixed to the steering column in order to rotate together with the steering column, the detection ring having different axial heights and/or widths and/or slopes and/or shapes at different angular positions; and the detection ring is made of steel.

16. The integrated torque and angle sensor as claimed in claim 9, wherein the magnetic driven member comprises a detection ring, surrounding the steering column and being fixed to the steering column in order to rotate together with the steering column, the detection ring having different axial heights and/or widths and/or slopes and/or shapes at different angular positions; and the detection ring bears magnets distributed in different circumferential regions of the detection ring.

17. The integrated torque and angle sensor as claimed in claim 9, wherein the magnetic driven member comprises a drive gear installed around the steering column so as to rotate together with the steering column, and at least two magnetic driven gears having different numbers of teeth and all being meshed with the drive gear.

18. The integrated torque and angle sensor as claimed in claim 9, wherein the magnetic driven member comprises a drive gear installed around the steering column so as to rotate together with the steering column, and a magnetic rack meshed with the drive gear.

19. The integrated torque and angle sensor as claimed in claim 9, wherein a temperature sensor for detecting steering column temperature is also integrated.

20. The integrated torque and angle sensor as claimed in claim 9, wherein the base plate comprises two or more base plates, arranged around the steering column and connected to each other by a flexible electrical cable.

21. A steering column active steering state monitoring system, comprising the integrated torque and angle sensor as claimed in claim 9, and a data processing unit configured to determine a steering torque and steering angle of the steering column on the basis of an output signal of the integrated torque and angle sensor.

22. The steering column active steering state monitoring system as claimed in claim 21, wherein the first magnetic field detection element of the torque and angle sensor comprises two or more pairs of magnetic field detection coils, and the second magnetic field detection element comprises two or more magnetic field detection coils; and
- the data processing unit is further configured to subject the determined steering torque and steering angle to comprehensive processing and credibility evaluation, to obtain comprehensive steering torque and steering angle data.

23. The integrated torque and angle sensor as claimed in claim 9, wherein the magnetic driven member includes magnetizable material.

24. The integrated torque and angle sensor as claimed in claim 9, wherein the magnetic driven member bears a magnet.

* * * * *